UNITED STATES PATENT OFFICE.

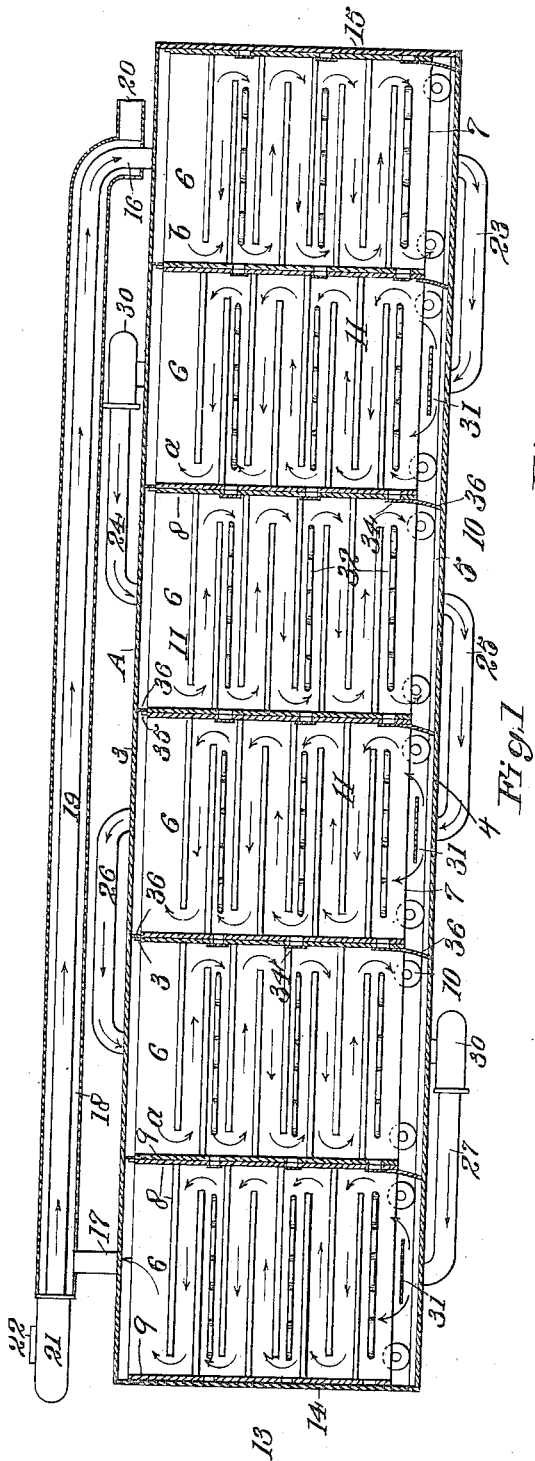

EMIL CLEMENS HORST, OF SAN FRANCISCO, CALIFORNIA.

DRIER.

1,294,804.

Specification of Letters Patent.  Patented Feb. 18, 1919.

Application filed April 25, 1918. Serial No. 230,744.

*To all whom it may concern:*

Be it known that I, EMIL CLEMENS HORST, a citizen of the United States, residing at the city and county of San Francisco and State of California, have invented new and useful Improvements in Driers, of which the following is a specification.

This invention relates to that class of apparatus in which food products, such as fruits, vegetables, meats, etc., are dried by hot air.

One of the objects of the present invention is to provide a novel method and apparatus for drying food products for preservation, which consists in providing a chamber through which the food products are passed. It also consists in means for maintaining an air current through said chamber, means for deflecting the air current so that it will pass through, over and under trays upon which the food products are placed, and also in providing means for gradually increasing the temperature of the air during its passage through the drier.

Another object of the invention is to provide a drier which permits a continuous operation; that is, a drier in which the food products may be placed whenever desired and removed when dried without interfering with other products which are in different stages of drying.

Another object of the invention is to provide means for subjecting the food product to be dried to the air at a point where it has reached its highest temperature and where it also contains the highest percentage of moisture; and, furthermore, to provide means for passing the food product, after insertion, through the drier and the air current passing therethrough from the point of highest temperature to the point of lowest temperature, so that the food product will first be subjected to a high temperature and then gradually to a reduced temperature until it is finally dried and removed at the point of lowest temperature and where the air contains the least humidity.

Another object of the invention is to provide a drier which may be termed a tunnel drier, said tunnel drier being provided with tracks for the reception of cars upon which trays containing the food products to be treated may be placed, and to construct each car so that it forms an individual drying compartment when placed within the tunnel of the drier; and also to provide means for alternately forcing an air current first downwardly through the trays and then upwardly through the same, said operation or reversing of the air current taking place during the different positions assumed by the car while passing through the tunnel of the drier.

Another object of the invention is to provide means for heating each individual car or compartment during its passage through the tunnel of the drier, and to provide automatic packing flaps to prevent undue leakage of air longitudinally through the tunnel.

Further objects will hereinafter appear.

The invention consists of the parts and the construction and combination of parts as hereinafter more fully described and claimed, having reference to the accompanying drawings, in which—

Figure 1 is a central, longitudinal, vertical section through the drier.

Fig. 2 is a detail plan section of one end of the drier.

Fig. 3 is a vertical cross section.

Fig. 4 is a detail side elevation and section of one of the cars, showing the position of the flap which closes the opening through which the steam heating coils pass when the car is moved from one position to another.

Referring to the drawings in detail, A indicates, in general, an elongated housing consisting of side walls 2, a top section 3, and a bottom or floor section 4. Extending from end to end of the housing is a pair of tracks 5, and adapted to travel on the said tracks are cars 6. The present drawing illustrates a housing sufficiently long to receive six cars. In actual practice, a greater number of cars will be employed and the housing or drier will, therefore, be considerably longer and may be termed a tunnel drier.

Each car consists of a bottom frame 7, a pair of end frames 8 and 9, and four or more wheels 10 are provided upon which the car frame is supported. The end frames 8 and 9 are provided with shelves for the reception of drying trays, such as shown at 11, and these are adapted to be placed in staggered fashion to permit the air to travel over and under the trays, as shown by the arrows *a* in Fig. 1.

Each car, during its passage through the tunnel, will serve as a separate drying compartment and the products to be dried, whether fruits, vegetables, meats, or the like, may, therefore, be in different stages of preparation. For instance, one car may just have been entered, that is, loaded with fresh vegetables, while another car may be ready for removal, and still other cars of fruits, vegetables, etc., will be in different stages of drying. The cars are preferably entered at the end shown at 13 which is closed by a suitable door 14 and are removed at the opposite end, which is also closed by a door 15.

The air employed for the purpose of drying the food products enters at 16 and travels in the general direction of arrow $b$ through the drier, discharging at the point 17 into a preheater 18 surrounding a pipe 19 and is finally permitted to escape to the atmosphere through a pipe 20. Air circulation may be obtained in any suitable manner, but preferably by the employment of a blower 21 which takes air directly from the atmosphere through a pipe 22. This air, after passing through the blower, discharges through pipe 19 and enters the drier at the point 16. From here it passes in a downward direction through a car positioned in direct alinement with the pipe 16 and a lower pipe 23. The opposite end of pipe 23 is extended sufficiently far to bring it into alinement with the second car. The air is thus directed upwardly through this car and discharges into a pipe 24. The opposite end of this pipe is again extended into alinement with the succeeding car and this construction is extended, by providing the pipes 25, 26 and 27, to a point where it will direct the air in an upward direction through the last car which is in direct alinement with the pipe 17.

Intermediate booster blowers, such as shown at 30, may be employed to maintain the air in motion, and deflectors 31 may be employed to equally distribute the air during its passage through the housing.

For the purpose of gradually increasing the temperature of the air during its travel through the several cars, I have provided a series of steam heated coils 32. These coils extend through the side walls 2 of the drier and are suitably supported in relation to the same. One coil, for instance 32, (see Fig. 2) extends inwardly between the trays of a car almost to the center of the same, while an opposite coil $32^a$ extends inwardly an equal distance from the opposite wall. These coils are here shown as positioned in alinement and are stationary.

The heating coils mounted as here shown necessitate a sufficient spacing between the trays to permit the cars to move along the tracks without striking or in any way interfering with the coils and they also necessitate the slotting of the end walls 8 and 9 of each car to permit the coils to pass through between the trays while the cars are being moved. These slots are indicated at 33 and they are normally closed, when a car reaches a predetermined position, by spring-actuated flaps 34. These flaps strike the heating coils when the car is moving along the track and are thus deflected until a set of coils reach a position intermediate the trays. They then automatically swing back into position and thus close the slots 33, thereby preventing air from escaping endwise through the cars when within the tunnel.

The forward end of each car is provided with a projection, such as shown at 35, which also engages yielding flaps 36 secured in the sides 2 of the tunnel. These flaps engage the projections 35 and thereby prevent the air from passing along the sides of the car; similar flaps being also provided at the top and bottom of the tunnel to engage the top and bottom of each car, thus sealing it on all sides against end leakage of air through the tunnel.

The cars when run into the tunnel assume the position shown in Fig. 1, that is, the removal of a car containing products which have been entirely dried permits the whole string of cars to be moved ahead so that a car containing fresh products may be inserted. They are thus advanced one car length at a time but otherwise remain stationary during the successive stages of drying. The flaps 36 will, of course, engage the projections on the cars at the points where they remain stationary, thus sealing the tunnel and preventing the air from passing endwise through the same and they, at the same time, permit each car to serve as an individual drying compartment. The product to be dried is, of course, subjected to the greatest heat when first inserted, the temperature being gradually reduced as the car advances until it is finally removed through the door 15. Air locks may be provided at each end, if desired, so that the passage of the drying air through the tunnel and the several cars will not be interfered with when cars are removed or inserted.

Each heating coil is fed from a live steam pipe and as each coil is provided with a valve, it is obvious that practically any temperature may be obtained as the air advances from car to car. The gradual increase of temperature is of great importance as it enormously increases the moisture-carrying capacity of the same. The drying efficiency or absorption of the air thus remains constant during its entire passage through the drier. This heat is not wasted as the preheater robs the discharging air of its heat, thereby bringing the incoming air to the desired temperature before it enters the drier.

The preheated air entering the drier will, under normal conditions, attain a temperature of 100° Fahrenheit and will, due to the employment of the steam heating coils 32, reach the temperature of approximately 175° Fahrenheit when discharging at the opposite end. The atmospheric air entering pipe 22 may be comparatively low, for instance 75° Fahrenheit, but it is quickly raised to 100° Fahrenheit or any temperature desired by passing it through the preheater, a feature which is of great importance when the general economy of a plant of this character is to be considered.

The trays for the reception of the products to be dried are rectangular in shape and are staggered in relation to each other as shown in Fig. 1, to form a passage for the air when it is passing either upwardly or downwardly through the car. This same feature may be obtained by leaving one end of the tray uncovered when placing the products thereon. This is an important feature as it would otherwise be practically impossible to direct the air in the direction of arrows a.

I also wish it understood that the materials and finish of the several parts employed may be such as the experience and judgment of the manufacturer may dictate.

Having thus described my invention, what I claim and desire to secure by Letters Patent is—

1. An apparatus for drying food products, which comprises a tunnel shaped drier, means for forcing an air current through said tunnel shaped drier, means for increasing the temperature and humidity of the air during its passage through the tunnel, means for entering the products to be dried at the point where the air discharges, means for advancing the product step by step through the tunnel, means for deflecting the air during its passage through the tunnel so that it alternately passes upward through the product and downward through the product, a second means for deflecting the air during its upward and downward passage so that it will alternately pass over and under the product, and means for removing the product at the opposite end of the tunnel where the air is lowest in temperature and carries the least humidity.

2. A drier comprising a tunnel-shaped housing, a pair of tracks extending through said housing from end to end thereof, a plurality of cars adapted to be moved along said tracks through the housing, a plurality of superposed, interspaced trays carried by each car for the reception of the product to be dried, end walls in each car to permit each car to serve as an individual drying compartment during its passage through the tunnel of the drier, means for maintaining an air current in one direction through the tunnel, means for deflecting said air current so that it will alternately pass upwardly and downwardly through the trays carried by each car during the passage of the cars through the drier, and means on each car for preventing the air from traveling lengthwise through the tunnel.

3. A drier comprising a tunnel-shaped housing, a pair of tracks extending through said housing from end to end thereof, a plurality of cars adapted to be moved along said tracks through the housing, a plurality of superposed, interspaced trays carried by each car for the reception of the product to be dried, end walls in each car to permit each car to serve as an individual drying compartment during its passage through the tunnel of the drier, means for maintaining an air current in one direction through the tunnel, means for deflecting said air current so that it will alternately pass upwardly and downwardly through the trays carried by each car during the passage of the cars through the drier, means on each car for preventing the air from traveling lengthwise through the tunnel, and means for gradually increasing the temperature of the air during its passage through the tunnel and the cars.

4. A drier for food products comprising an elongated tunnel-shaped housing, a pair of rails extending through the housing, a closure for each end of the housing, a plurality of cars adapted to be placed within the housing end for end, means on each car for supporting trays for the reception of the food products, means for alternately directing an air blast upwardly and downwardly through each car, and means for deflecting the air either during its upward or downward passage through the cars so that it will travel under and over each tray and also partly through the same.

5. A drier for food products comprising an elongated tunnel-shaped housing, a pair of rails extending through the housing, a closure for each end of the housing, a plurality of cars adapted to be placed within the housing end for end, means on each car for supporting trays for the reception of the food products, means for alternately directing an air blast upwardly and downwardly through each car, means for deflecting the air either during its upward or downward passage through the cars so that it will travel under and over each tray and also partly through the same, means for passing the air from one car to another, and means for gradually increasing the temperature of said air.

6. A drier for food products comprising an elongated tunnel-shaped housing, a pair of rails extending through the housing, a closure for each end of the housing, a plurality of cars adapted to be placed within the housing end for end, means on each car for supporting trays for the reception of the food products, means for alternately directing an air blast upwardly and downwardly through each car, means for deflecting the air either during its upward or downward passage through the cars so that it will travel under and over each tray and also partly through the same, and means on each car for preventing the air from passing lengthwise through the tunnel.

7. A drier for food products comprising an elongated tunnel-shaped housing, a pair of rails extending through the housing, a closure for each end of the housing, a plurality of cars adapted to be placed within the housing end for end, means on each car for supporting trays for the reception of the food products, means for alternately directing an air blast upwardly and downwardly through each car, means for deflecting the air either during its upward or downward passage through the cars so that it will travel under and over each tray and also partly through the same, means for passing the air from one car to another, means for gradually increasing the temperature of said air, said means comprising steam heating coils projecting inwardly from the sides of the tunnel between the trays in each car, and means for regulating the quantity of steam passing through each coil.

8. A drier for food products comprising an elongated tunnel-shaped housing, a pair of rails extending through the housing, a closure for each end of the housing, a plurality of cars adapted to be placed within the housing end for end, means on said car for supporting trays for the reception of the food products, means for alternately directing an air blast upwardly and downwardly through each car, means for deflecting the air either during its upward or downward passage through the cars so that it will travel under and over each tray and also partly through the same, means for passing the air from one car to another, means for gradually increasing the temperature of said air, said means comprising steam heating coils projecting inwardly from the sides of the tunnel between the trays in each car, means for regulating the quantity of steam passing through each coil, and means on each car for preventing the air from passing lengthwise through the tunnel.

9. A drier comprising a tunnel-shaped housing, a pair of tracks extending through said housing from end to end thereof, a plurality of cars adapted to be moved upon said tracks through the housing, a plurality of superposed, interspaced trays carried by each car for the reception of the product to be dried, means for maintaining an air current in one direction through the tunnel, means for deflecting said air current so that it will alternately pass upwardly and downwardly through the trays carried by each car during the passage of the car through the tunnel, and a plurality of steam-heated coils projecting inwardly from the sides of the tunnel between the trays in each car.

In testimony whereof I have hereunto set my hand in the presence of two subscribing witnesses.

EMIL CLEMENS HORST.

Witnesses:
 THOS. CASTBERG,
 JOHN H. HERRING.